United States Patent
O et al.

(10) Patent No.: US 7,958,118 B2
(45) Date of Patent: Jun. 7, 2011

(54) METHOD FOR RETRIEVING KEYWORD SHOWING DIFFERENCE BETWEEN TWO GROUPS AND SYSTEM FOR EXECUTING THE METHOD

(75) Inventors: Jangmin O, Gyeonggi-do (KR); Dong Wook Kim, Gyeonggi-do (KR); Jae-Keol Choi, Seoul (KR); JaeHo Choi, Gyeonggi-do (KR); Taeil Kim, Seoul (KR); Kyoo Min Im, Seoul (KR)

(73) Assignee: NHN Corporation, Seongnam-si (KR)

( * ) Notice: Subject to any disclaimer, the term of this patent is extended or adjusted under 35 U.S.C. 154(b) by 494 days.

(21) Appl. No.: 11/744,985

(22) Filed: May 7, 2007

(65) Prior Publication Data

US 2007/0276831 A1    Nov. 29, 2007

(30) Foreign Application Priority Data

May 9, 2006    (KR) ..................... 10-2006-0041656

(51) Int. Cl.
*G06F 7/00* (2006.01)
*G06F 17/30* (2006.01)
(52) U.S. Cl. ....................................................... 707/732
(58) Field of Classification Search ................. 707/100, 707/6, 732, 735
See application file for complete search history.

(56) References Cited

U.S. PATENT DOCUMENTS

| | | | |
|---|---|---|---|
| 5,848,409 A * | 12/1998 | Ahn ..................................... | 1/1 |
| 6,421,675 B1 * | 7/2002 | Ryan et al. .................... | 707/100 |
| 6,456,998 B1 | 9/2002 | Buis et al. | |
| 6,493,702 B1 * | 12/2002 | Adar et al. ........................... | 1/1 |
| 6,584,456 B1 * | 6/2003 | Dom et al. ...................... | 706/45 |
| 6,687,696 B2 * | 2/2004 | Hofmann et al. ................. | 707/6 |
| 6,714,975 B1 * | 3/2004 | Aggarwal et al. ............ | 709/224 |
| 7,072,846 B1 * | 7/2006 | Robinson ........................ | 705/10 |
| 2005/0060300 A1 | 3/2005 | Stolte et al. | |

FOREIGN PATENT DOCUMENTS

| | | |
|---|---|---|
| JP | 2004-348626 | 12/2004 |
| KR | 1020010082984 | 8/2001 |
| KR | 1020010086259 | 9/2001 |
| KR | 1020020001295 | 1/2002 |
| KR | 1020050055679 | 6/2005 |

* cited by examiner

*Primary Examiner* — Greta L Robinson
*Assistant Examiner* — Jeffrey Chang
(74) *Attorney, Agent, or Firm* — H.C. Park & Associates, PLC

(57) ABSTRACT

A method and system for sorting out a keyword showing a difference between two groups is provided. The method includes the steps of: defining a tuple with respect to an N number of keywords and defining a data group including a group of the tuple; creating a keyword value for each of the N number of keywords by using the data group; and creating a keyword group associated with the keyword value, and creating an output group including the keyword group, wherein the two groups includes a first group and a second group.

17 Claims, 9 Drawing Sheets

METHOD FOR RETRIEVING KEYWORD SHOWING DIFFERENCE BETWEEN TWO GROUPS AND SYSTEM FOR EXECUTING THE METHOD

CROSS-REFERENCE TO RELATED APPLICATION

This application claims the benefit of Korean Patent Application No. 10-2006-0041656, filed on May 9, 2006, in the Korean Intellectual Property Office, the disclosure of which is incorporated herein by reference.

BACKGROUND OF THE INVENTION

1. Field of the Invention

The present invention relates to a method of sorting out a keyword showing a difference between two groups and a system for executing the method, and more particularly, to a method of sorting out a keyword using a probability that the keyword is retrieved and a distribution of a number of searches of each group with respect to the keyword, and a system for executing the method.

2. Description of Related Art

In a conventional art, a method of sorting out a keyword showing a difference between two groups compares a difference in a number of searches for the keyword between the two groups. However, the above-described method may neither standardize two groups nor compare the two groups when a total number of searches of one group is significantly greater than a total number of searches of the other group or when a great number of similar fields and different fields are included in the two groups.

For example, in an age-based comparison, when a total number of searches of teenagers is significantly greater than a total number of searches of people in their forties, the two groups show a difference in the number of searches for an identical keyword. Accordingly, it is difficult to extract information about a difference between two groups and the like. Also, in the conventional art, it is difficult to perform a method of sorting out a keyword that teenagers have interest in while people in their forties have almost no interest in, or sorting out a keyword that people in their forties have interest in while teenagers have almost no interest in.

As described above, although two groups include a great number of searches for a predetermined keyword, a number of searches of one group may be significantly greater than the number of searches of the other group. Also, a degree of interest between two groups may not be completely distinguished. In this case, it may be difficult to estimate a difference or a degree of interest between two groups with respect to a keyword by only comparing a number of searches of one group with the number of searches of the other group.

BRIEF SUMMARY

An aspect of the present invention provides a method of sorting out a keyword showing a difference between two groups, and a system for executing the method.

Another aspect of the present invention is to assign a keyword value for each keyword to a keyword showing a difference between two groups, and thereby create an output group in which a keyword group is sorted by the keyword value and to readily predict the difference or a degree of interest between two groups.

Another aspect of the present invention is to differently sort the keyword in the output group for each of the groups using the keyword value.

Another aspect of the present invention is to reflect a number of searches for the keyword in the keyword value and thereby place a keyword frequently retrieved by two groups in a comparatively higher place of the output group.

According to an aspect of the present invention, there is provided a computer-implemented method of sorting out a keyword showing a difference between two groups, the method including the steps of: defining a tuple with respect to an N number of keywords and defining a data group including a group of the tuple; creating a keyword value for each of the N number of keywords by using the data group; and creating a keyword group associated with the keyword value, and creating an output group including the keyword group, wherein the two groups includes a first group and a second group.

In an aspect of the present invention, the step of defining may include the steps of: a first step of defining the tuple with respect to the keyword, the tuple including a group including the keyword, a number of searches of the first group for the keyword, and a number of searches of the second group for the keyword; and a second step of repeating the performing of the first step with respect to each of the N number of keywords and thereby defining the data group including the tuple as an element.

In an aspect of the present invention, the step of creating the keyword value may include the steps of: estimating a probability value group which is a group of probability values with respect to a probability that a user retrieves a predetermined keyword based on the data group; and creating the keyword value for the keyword using the probability value group, wherein the keyword value indicates a distribution difference between the number of searches of the first group and the number of searches of the second group for an identical keyword, and a relative importance of the identical keyword in each of the first group and the second group.

In an aspect of the present invention, the step of estimating may include the steps of: defining the probability value by assuming a probability model, as a discrete distribution, in which the user retrieves the keyword from each of the first group and the second group; checking a distribution of the number of searches of each of the first group and the second group using a multinomial distribution; and estimating a probability value group corresponding to a parameter of the discrete distribution using a maximum-likelihood estimate of the multinomial distribution.

According to another aspect of the present invention, there is provided a system for sorting out a keyword showing a difference between two groups, the system including: a data group definition component configured to define a predetermined tuple with respect to an N number of keywords and define a data group including a group of the tuple; a keyword value creator configured to create a keyword value for each of the N number of keywords by using the data group; and an output group creator configured to create a keyword group associated with the keyword value, and create an output group including the keyword group, wherein the two groups includes a first group and a second group.

Application of the present invention includes, but not limited to, detailed pre-select information for advertisers to bid for keyword advertisings which would produce maximum marketing effects. The present invention can show different favorable impressions on the same keyword depending on the groups, such as different age groups, different geographical groups, different sexuality groups, and etc., such that the advertisers can effectively select a keyword for their keyword advertising based upon those information. For example, a company which sells women products would not use a keyword for their keyword advertising if the keyword is not favored by the women group. Further, the keywords showing difference between two groups can be used for various researches, instead of surveys, because those keywords can show characteristics or opinions of each group.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
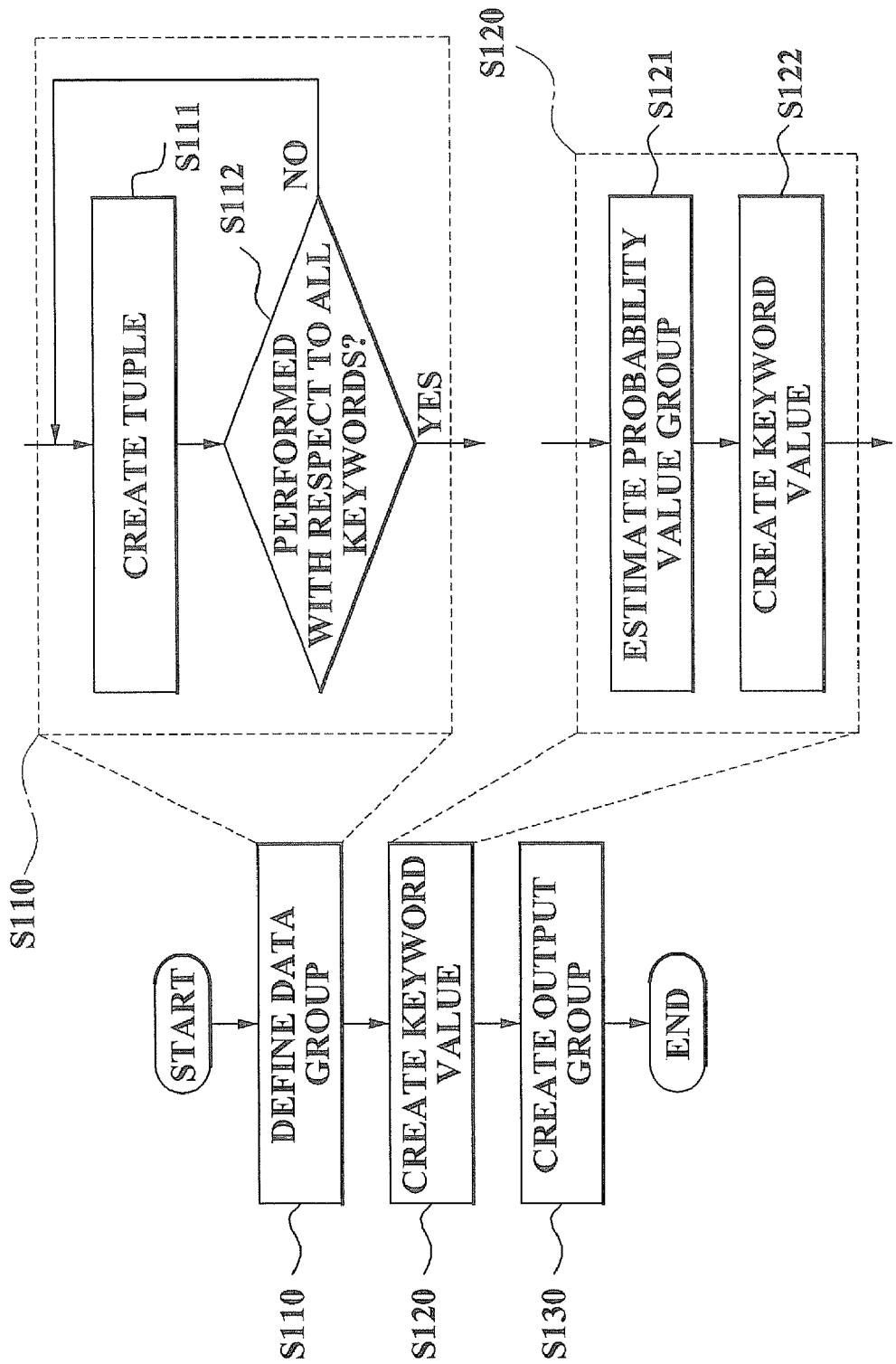
FIG. 1 is a flowchart illustrating a method of sorting out a keyword showing a difference between two groups according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a flowchart illustrating a method of sorting out a keyword showing a difference between two groups according to an exemplary embodiment of the present invention. In this instance, the two groups may include a first group and a second group.

In operation S110, a keyword retrieval system defines a predetermined number of tuples with respect to an N number of keywords and defines a data group including a group of the tuples. As shown in FIG. 1, operation S110 may include operations S111 and S112.

In operation S111, the keyword retrieval system defines the tuple with respect to the keyword. In this instance, the tuple includes a group including the keyword, a number of searches of the first group for the keyword, and a number of searches of the second group for the keyword. Also, $t_n$ corresponding to an nth tuple may be defined by $$t_n = (q_n, c_n^y, c_n^o). \quad \text{[Equation 1]}$$

In this instance, $q_n$ indicates an $n^{th}$ keyword, $c_n^y$ indicates the number of searches of the keyword of the first group, $C_n^o$ indicates the number of searches of the keyword of the second group.

In operation S112, the keyword retrieval system repeatedly performs operations S111 with respect to each of the N number of keywords and thereby defines the data group including the tuple as an element. The data group D with respect to the total N number of keywords may be defined as the group of the tuples by $$D = \{t_n | n=1, \ldots, N\}. \quad \text{[Equation 2]}$$

In operation S120, the keyword retrieval system creates a keyword value for each of the N number of keywords by using the data group. In this case, as shown in FIG. 1, operation S120 may include operations S121 and S122.

In operation S121, the keyword retrieval system estimates a probability value group which is a group of probability values with respect to a probability that a user retrieves a predetermined keyword based on the data group. In this instance, two schemes are disclosed herein to estimate the probability value group. The two schemes will be further described in detail with reference to FIGS. 2 and 3.

In operation S122, the keyword retrieval system creates the keyword value for the keyword using the probability value group. In this instance, the keyword value may indicate a distribution difference between the number of searches of the first group and the number of searches of the second group for an identical keyword, and a relative importance of the identical keyword in each of the first group and the second group. Operation S122 will be further described in detail with reference to FIG. 4.

In operation S130, the keyword retrieval system creates a keyword group associated with the keyword value, and creates an output group including the keyword group. In this instance, the keyword group may include a group including the keyword, the keyword value, and the number of searches for the keyword. Also, the output group may sort the keyword group by the keyword value.

Accordingly, by using Ly corresponding to an output group of the first group and Lo corresponding to an output group of the second group, the output groups may be represented as $$Ly = \{(q_1^y, s_1^y, c_1^y), \ldots, (q_N^y, s_N^y, c_N^y) | s_i^y > s_{i+1}^y \text{ where } i = 1, \ldots N-1\},$$

$$Lo = \{(q_1^o, s_1^o, c_1^o), \ldots, (q_N^o, s_N^o, c_N^o) | s_i^o > s_{i+1}^o \text{ where } i = 1, \ldots N-1\}. \quad [\text{Equation 3}]$$

In this instance, $s_i^y$ and $s_i^o$ indicate $i^{th}$ keyword values in the output groups Ly and Lo respectively.

Also, in a method of sorting out a keyword showing a difference between two groups, when 1) locations iy and io are different from each other with assumption that iy is a location in the output group Ly of a keyword q, and io is a location in the output group Lo of the keyword q, and 2) the number of searches is found for each keyword sorted in each list, a characteristic that a rank change in the output group is negligible is required.

Specifically, each of the output groups Ly and Lo sorted by the keyword value should be listed in a different usage format. In this instance, a keyword frequently retrieved by a corresponding group should rank in a comparatively higher place than other keywords. A method of creating the keyword value to satisfy the above-described characteristic will be described in detail with reference to FIGS. 2 through 4.

As described above, according to the present invention, it is possible to assign a keyword value to each of the keywords showing a difference between two groups and thereby create an output group in which a keyword group is sorted by the keyword value, and to readily predict the difference or a degree of interest between the two groups.

Figure 2:
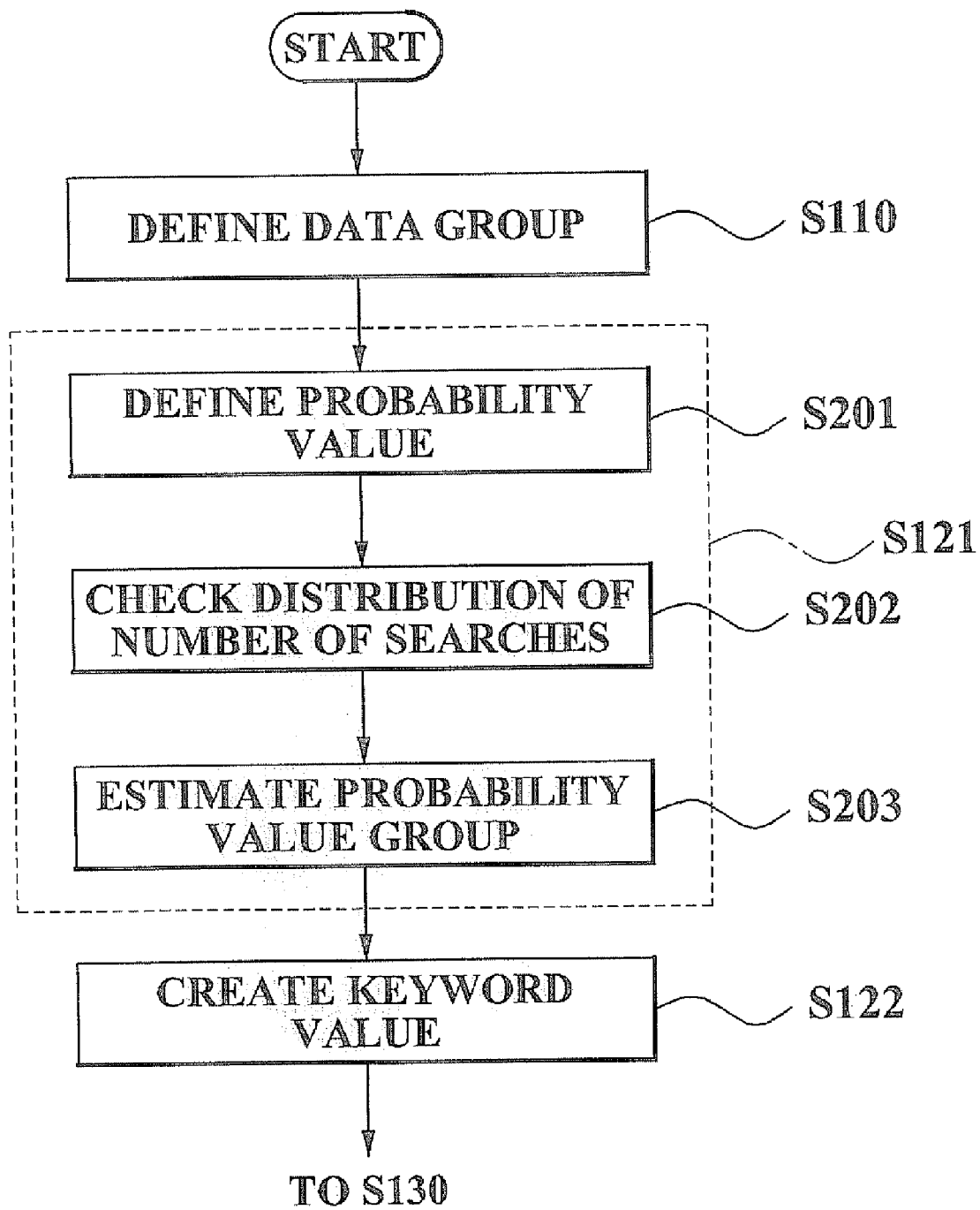
FIG. 2 is a flowchart illustrating a method of estimating a probability value group according to an exemplary embodiment of the present invention.

FIG. 2 is a flowchart illustrating a method of estimating a probability value group according to an exemplary embodiment of the present invention. As shown in FIG. 2, operation S121 may include operations S201 through S203 and thereby be performed.

In operation S201, the keyword retrieval system defines the probability value by assuming a probability model, as a discrete distribution, in which the user retrieves the keyword from each of the first group and the second group. In this instance, the probability model in which a user of the first group retrieves a keyword q may be assumed as the discrete distribution as follows:

$$\text{Discrete}(q | p_1^y, \ldots, p_N^y), \quad [\text{Equation 4}]$$

$$\sum_n p_n = 1.$$

In this instance, when $q_i^y$ corresponding to an $i^{th}$ keyword is identical to the keyword q, the probability value is defined by $P(q) = p_i^y$.

In operation S202, the keyword retrieval system checks a distribution of the number of searches of each of the first group and the second group using a multinomial distribution. In this instance, when it is assumed that a total number of all searches of users included in the first group is $M^y$ and each of the users individually operates to create a model of the number of searches of the first group, the distribution of the number of searches of the first group may be defined as the multinomial distribution as follows:

$$\text{Multi}(c_1, \ldots, c_N | p_1^y, \ldots, p_N^y) \propto \prod_n p_n^{y c_n}, \quad [\text{Equation 5}]$$

$$\sum_n c_n = M^y.$$

In operation S203, the keyword retrieval system estimates a probability value group corresponding to a parameter of the discrete distribution using a maximum-likelihood estimate of the multinomial distribution.

In the case of the first group, since an observed value corresponds to the number of searches, $\{c_1^y, \ldots, c_N^y\}$, $\{p_1^y, \ldots, p_N^y\}$ corresponding to a parameter of the model is estimated from the observed value. By using the maximum-likelihood estimate, the probability value group may be represented as

[Equation 6]

$$\{\hat{p}_1^y, \ldots, \hat{p}_N^y\} = \left\{ \frac{c_1^y}{M^y}, \ldots, \frac{c_1^y}{M^y} \right\} \quad [\text{Equation 6}]$$

A scheme of estimating the probability value group of the first group has been described above. The probability value group of the second group may be estimated by using the same scheme.

The other scheme of estimating the probability value group will be described in detail with reference to FIG. 3.

Figure 3:
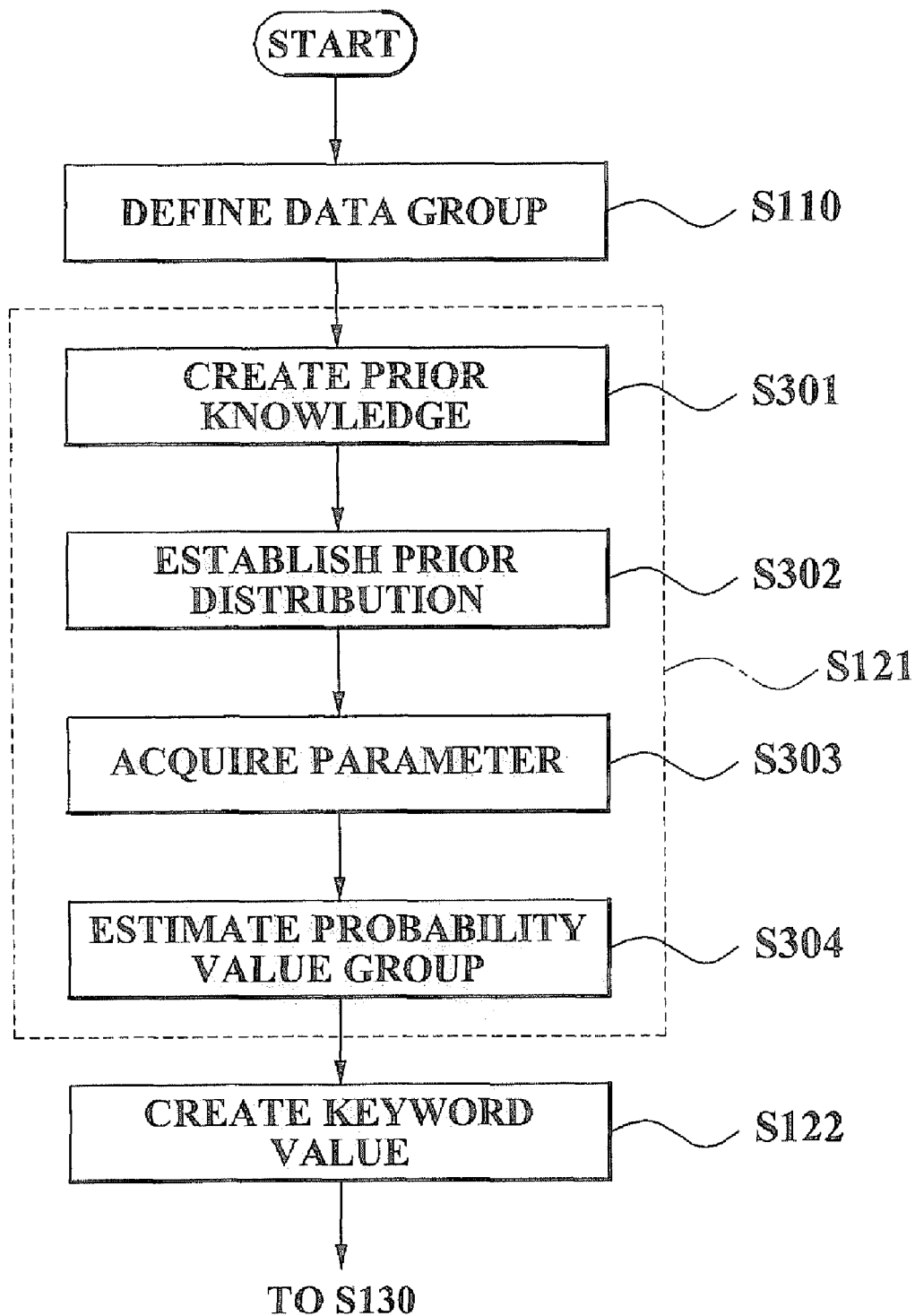
FIG. 3 is a flowchart illustrating a method of estimating a probability value group according to another exemplary embodiment of the present invention.

FIG. 3 is a flowchart illustrating a method of estimating a probability value group according to another exemplary embodiment of the present invention. As shown in FIG. 3, operation S121 may include operations S301 through S304, instead of operations S201 through S203, and thereby be performed.

In operation S301, the keyword retrieval system creates prior knowledge by using the data group. The prior knowledge includes a group of the number of searches for the keyword. In this instance, operation S301 may include creating a search number group including a number of searches for each of all keywords, included in the data group, as an element, and creating a result group as the prior knowledge. In this instance, the result group is calculated by applying a predetermined operation scheme to the search number group.

Also, the operation scheme may include 1) a scheme of applying a ratio, the ratio being a total number of searches of the first group to a total number of all searches, to each element of the search number group and thereby calculating a first result value group, and 2) a scheme of applying a ratio, the ratio being a total number of searches of the second group to the total number of all searches, to each element of the search number group and thereby calculating a second result value group. Also, the result group may include the first result value group and the second result value group.

The prior knowledge utilizes a total number of all searches of all users of the keyword retrieval system. Specifically, when the total number of searches of all the users for each keyword is represented as $\{C_1, \ldots, C_N\}$, and the total number of all searches is represented as $\Sigma C_n = M$, the prior knowledge with respect to the first group and the second group may be set to $$\{u_1^y, \ldots, u_N^y\} = \frac{M^y}{M}\{C_1, \ldots, C_N\}, \quad [\text{Equation 7}]$$

$$\{u_1^o, \ldots, u_N^o\} = \frac{M^o}{M}\{C_1, \ldots, C_N\}.$$

In operation S302, the keyword retrieval system establishes a prior distribution associated with a maximum-likelihood estimate and the prior knowledge by assuming the distribution of the probability value group as a Dirichlet distribution.

In this instance, it is assumed that the distribution of the probability value group $\{p_1^y, \ldots, p_N^y\}$ of the first group is Dirichlet distribution. Also, the Dirichlet distribution may be represented as $$Dirichlet(p_1, \ldots, p_N | u_1, \ldots, u_N) \propto \prod_{n=1}^{N} p_n^{u_n-1}, u_n > 0. \qquad \text{[Equation 8]}$$

The scheme utilizes a Bayesian estimate. The Bayesian estimate assumes a parameter as a distribution, not one fixed-point, and then estimates the distribution. The parameter may be assumed as the distribution by Equation 8 above.

In operation S303, the keyword retrieval system acquires a parameter by estimating a posterior distribution using the Bayesian estimate. The parameter describes the Dirichlet distribution.

In this instance, when the maximum likelihood estimate is Multi($c_1, \ldots, c_N | p_1^y, \ldots, p_N^y$), and the prior distribution is Dirichlet($p_1^y, \ldots, p_N^y | u_1^y, \ldots, u_N^y$), the Bayesian estimate estimates the posterior distribution Dirichlet($p_1^y, \ldots, p_N^y | u_1^y, \ldots, u_N^y$). The result may be reduced to the parameter describing the Dirichlet distribution as follows $$\{\tilde{u}_1^y, \ldots \tilde{u}_N^y\} = \{c_1 + u_1^y, \ldots, c_N + u_N^y\}. \qquad \text{[Equation 9]}$$

In operation S304, the keyword retrieval system estimates the probability value group based on the estimated posterior distribution. Specifically, as represented by 10 below, the probability value below, i.e. statistical value, may be acquired from the estimated posterior distribution and thereby the probability value group may be estimated as, $$\tilde{p}_i^y = E\{p_i^y\} = \frac{\tilde{u}_i^y}{\sum \tilde{u}_n^y}. \qquad \text{[Equation 10]}$$

One of advantages of the Bayesian estimate is to utilize the prior knowledge of a designer for applying a model. According to an exemplary embodiment of the present invention, in operation S301, the prior knowledge is applied in a format of $\{u_1^y, \ldots, u_N^y\}$ as described above.

The other scheme of estimating the probability value group of the first group has been described with reference to FIG. 3. The probability value group of the second group may be estimated by using the same scheme.

Figure 4:
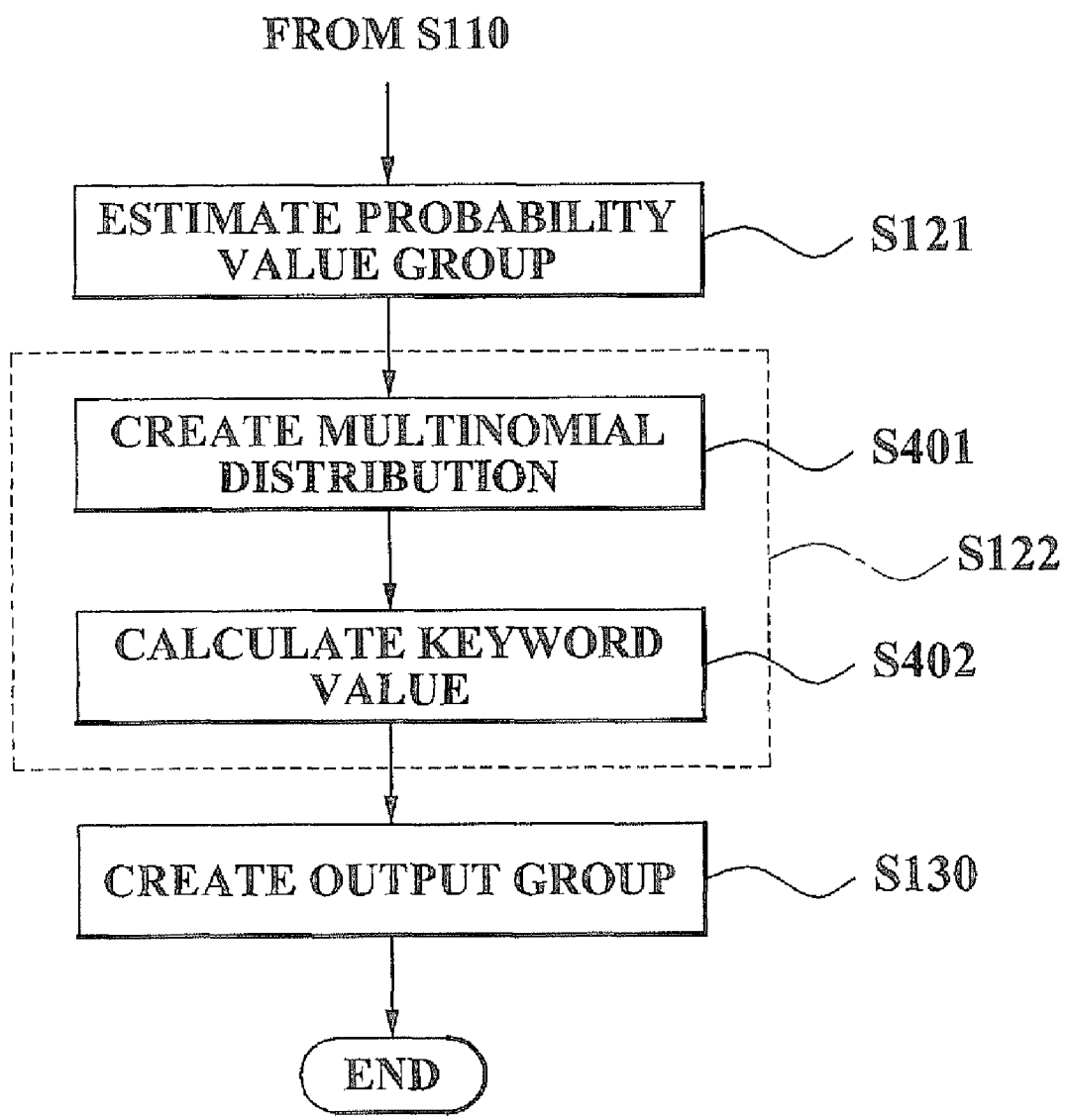
FIG. 4 is a flowchart illustrating a method of creating a keyword value according to an exemplary embodiment of the present invention.

FIG. 4 is a flowchart illustrating a method of creating a keyword value according to an exemplary embodiment of the present invention. As shown in FIG. 4, operation S122 may include operations S401 and S402.

In operation S401, the keyword retrieval system creates a multinomial distribution including the probability value group of each of the first group and the second group.

Specifically, the keyword retrieval system creates multinomial distributions Q and P including $\{\tilde{p}_i^y\}$ and $\{\tilde{p}_i^o\}$ with respect to the first group and the second group respectively, as indicated by $$Q = \text{Multi}\{c_1, \ldots, c_N | \tilde{p}_1^y, \ldots, \tilde{p}_N^y\},$$

$$P = \text{Multi}\{c_1, \ldots, c_N | \tilde{p}_1^o, \ldots, \tilde{p}_N^o\}. \qquad \text{[Equation 11]}$$

In operation S402, the keyword retrieval system calculates the keyword value, based on a Kullback-Leibler (KL) distance and a KL expression associated with the multinomial distribution, as a calculator configured to calculate a difference between two distributions. In this instance, the KL expression may utilize an absolute numerical value of the probability value for each of the first group and the second group, and a relative numerical value of the probability value between the first group and the second group. Also, a result value of the KL expression may indicate a distribution difference for the keyword between the first group and the second group, and a relative importance of the keyword in each of the first group and the second group.

In the KL distance, KL(Q||P) represented by the distribution Q of the first group and the distribution P of the second group is given by $$KL(Q\|P) = \sum_i \tilde{p}_i^y \log\left(\frac{\tilde{p}_i^y}{\tilde{p}_i^o}\right). \qquad \text{[Equation 12]}$$

The characteristic of KL(Q||P) is KL(Q||P)≧0, when the two distributions P and Q are identical, KL(Q||P) has a value of 0. However, in KL(Q||P), the $i^{th}$ keyword contributing to KL(Q||P) is $\tilde{p}_i^y \log$ $$\tilde{p}_i^y \log\left(\frac{\tilde{p}_i^y}{\tilde{p}_i^o}\right),$$

and an addition thereof becomes a total value. According, as the value of $\tilde{p}_i^y \log$ $$\tilde{p}_i^y \log\left(\frac{\tilde{p}_i^y}{\tilde{p}_i^o}\right)$$

increases, it can be seen that the $i^{th}$ keyword makes the two distributions P and Q show a difference. The keyword value defined herein is based on the theory as described above.

When a probability value of a posterior distribution of the first group and the probability value of the posterior distribution of the second group are $\tilde{p}_i^y$ and $\tilde{p}_i^o$ respectively for the $i^{th}$ keyword, a value of the $i^{th}$ keyword for the first keyword is defined by $$s_i^y = \tilde{p}_i^y \log\left(\frac{\tilde{p}_i^y}{\tilde{p}_i^o}\right). \qquad \text{[Equation 13]}$$

A greater keyword value of the first group indicates that the $i^{th}$ keyword occupies a relative importance in the first group, which shows the first group is greatly different from the second group.

The keyword value for the second group is an opposite concept to the keyword value for the first group, and is represented as $$s_i^o = \tilde{p}_i^o \log\left(\frac{\tilde{p}_i^o}{\tilde{p}_i^y}\right). \qquad \text{[Equation 14]}$$

As shown in Equation 13, a greater keyword value of the second group indicates that the $i^{th}$ keyword occupies a relatively importance ratio in the second group, which shows the second group is greatly different from the first group.

As described above, the keyword value may utilize an absolute numerical value of the probability value for each of the first group and the second group, and a relative numerical value of the probability value between the first group and the second group. Also, the keyword may be differently sorted in the output group depending upon the first group and the second group using the keyword value. Also, it is possible to reflect a number of searches for the keyword in the keyword value and thereby place a keyword frequently retrieved by two groups in a comparatively higher place of the output group.

Figure 5:
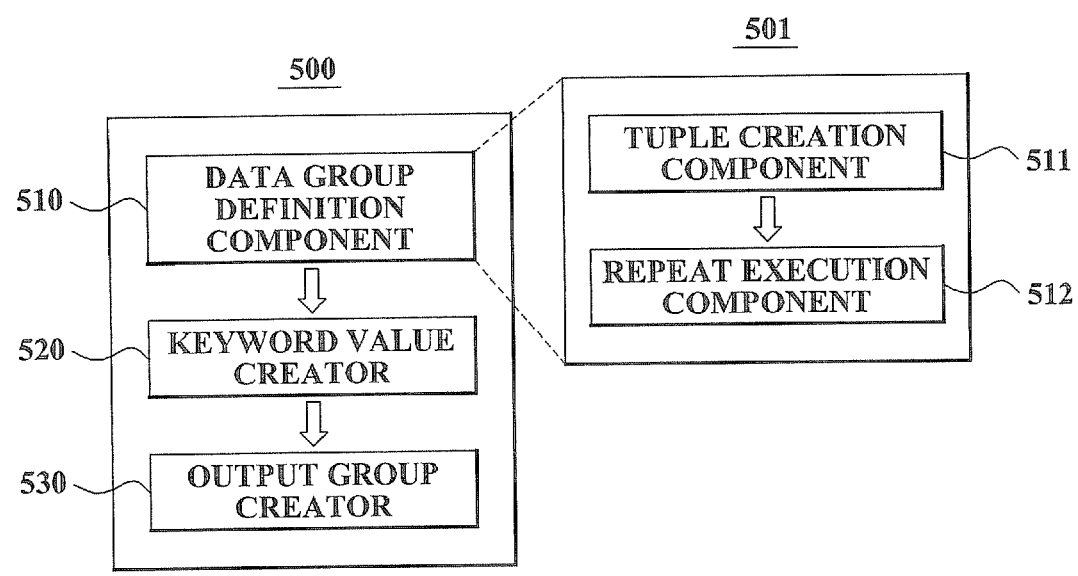
FIG. 5 is a block diagram illustrating an internal configuration of a keyword retrieval system for sorting out a keyword showing a difference between two groups according to an exemplary embodiment of the present invention.

FIG. 5 is a block diagram illustrating an internal configuration of a keyword retrieval system 500 for sorting out a keyword showing a difference between two groups according to an exemplary embodiment of the present invention. As shown in FIG. 5, the keyword retrieval system 500 may include a data group definition component 510, keyword value creator 520, and an output group creator 530.

The data group definition component 510 defines a predetermined tuple with respect to an N number of keywords and defines a data group including a group of the tuple. In this instance, the data group definition component 510 may include a tuple definition component 511 and a repeat execution component 512. The tuple definition component 511 defines the tuple with respect to the keyword. In this instance, the tuple includes a group including the keyword, a number of searches of the first group for the keyword, and a number of searches of the second group for the keyword. Also, the repeat execution component 512 repeatedly executes the tuple definition component 511 with respect to each of the N number of keywords and thereby defines the data group including the tuple as an element.

The keyword value creator 520 creates a keyword value for each of the N number of keywords by using the data group. The keyword value and the keyword value creator 520 will be further described in detail with reference to FIG. 6.

The output group creator 530 creates a keyword group associated with the keyword value, and creates an output group including the keyword group. In this instance, the keyword group may include a group including the keyword, the keyword value, and the number of searches for the keyword. Also, the output group may sort the keyword group by the keyword value.

Figure 6:
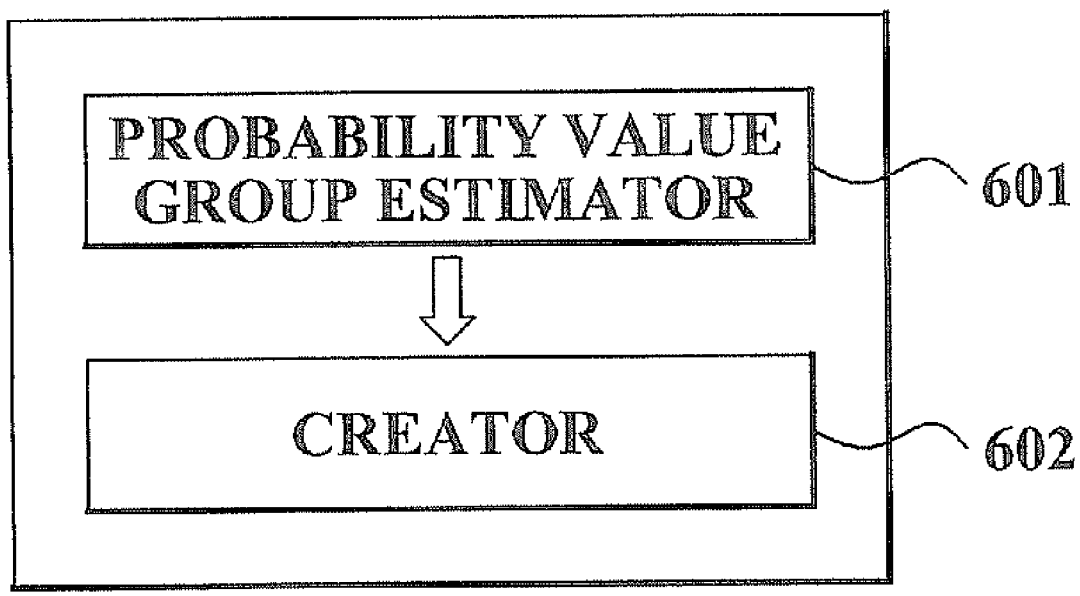
FIG. 6 is a block diagram illustrating an internal configuration of a keyword value creator according to an exemplary embodiment of the present invention.

FIG. 6 is a block diagram illustrating an internal configuration of the keyword value creator 520 according to an exemplary embodiment of the present invention. As shown in FIG. 6, the keyword value creator 520 may include a probability value group estimator 601 and a creator 602.

The probability value group estimator 601 estimates a probability value group which is a group of probability values with respect to a probability that a user retrieves a predetermined keyword based on the data group. In this instance, the internal configuration of the probability value group estimator 601 may be constructed using two schemes, which will be described in detail with reference to FIGS. 7 and 8.

The creator 602 creates the keyword value for the keyword using the probability value group. In this instance, the keyword value may indicate a distribution difference between the number of searches of the first group and the number of searches of the second group for an identical keyword, and a relative importance of the identical keyword in each of the first group and the second group. The internal configuration of the creator 602 will be further described in detail with reference to FIG. 9.

Figure 7:
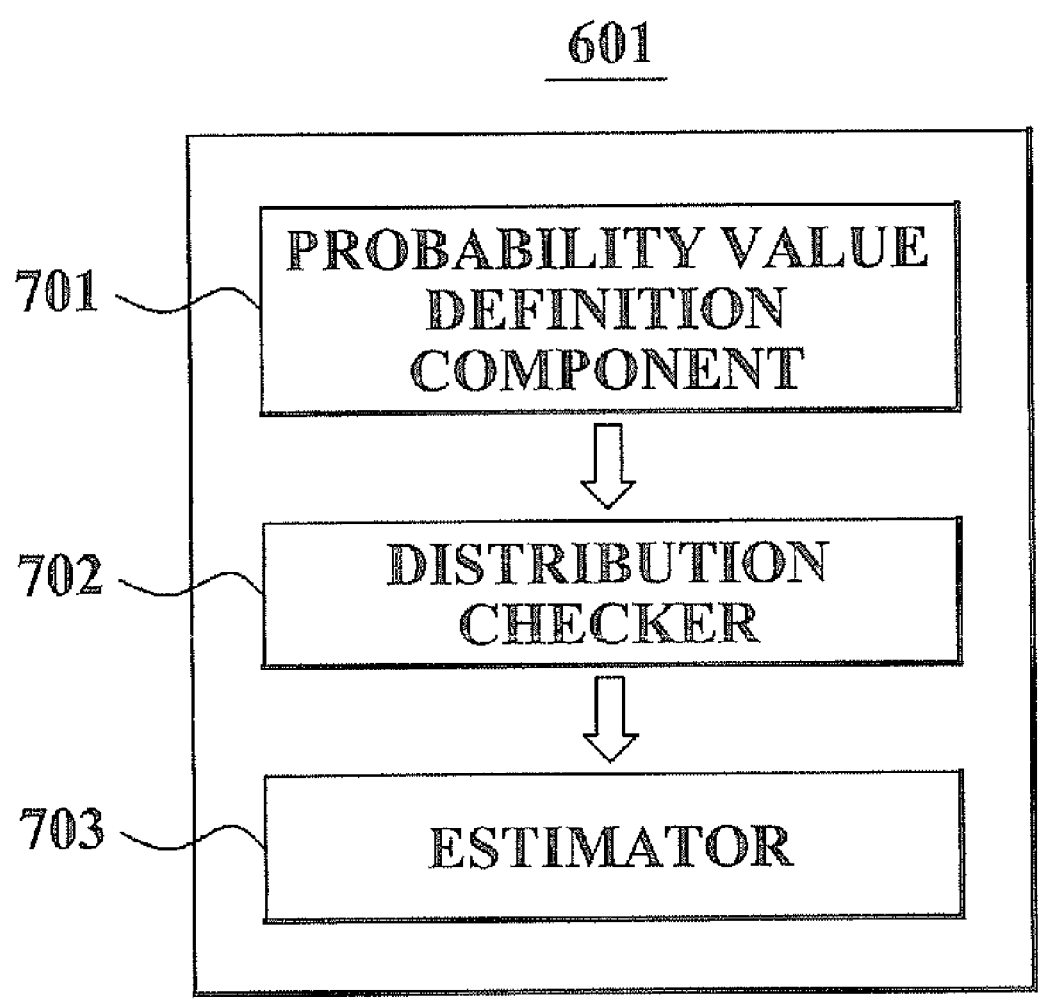
FIG. 7 is a block diagram illustrating an internal configuration of a probability value group estimator according to an exemplary embodiment of the present invention.

FIG. 7 is a block diagram illustrating an internal configuration of the probability value group estimator 701 according to an exemplary embodiment of the present invention. As shown in FIG. 7, the probability value group estimator 601 may include a probability value definition component 701, a distribution checker 702, and an estimator 703.

The probability value definition component 701 defines the probability value by assuming a probability model, as a discrete distribution, in which the user retrieves the keyword from each of the first group and the second group. In this instance, the discrete distribution may utilize Equation 4 described above with reference to FIG. 2.

The distribution checker 702 checks a distribution of the number of searches of each of the first group and the second group using a multinomial distribution. In this instance, it may be assumed that each of users individually operates to create a model of the number of searches of the first group or the second group, so as to check the distribution of the number of searches of each of the first group and the second group using the multinomial distribution.

The estimator 703 estimates a probability value group corresponding to a parameter of the discrete distribution using a maximum-likelihood estimate of the multinomial distribution. In this instance, the probability value of the keyword in the probability value group may include a ratio of a number of searches associated with the keyword to a total number of all searches of the first group or the second group.

Figure 8:
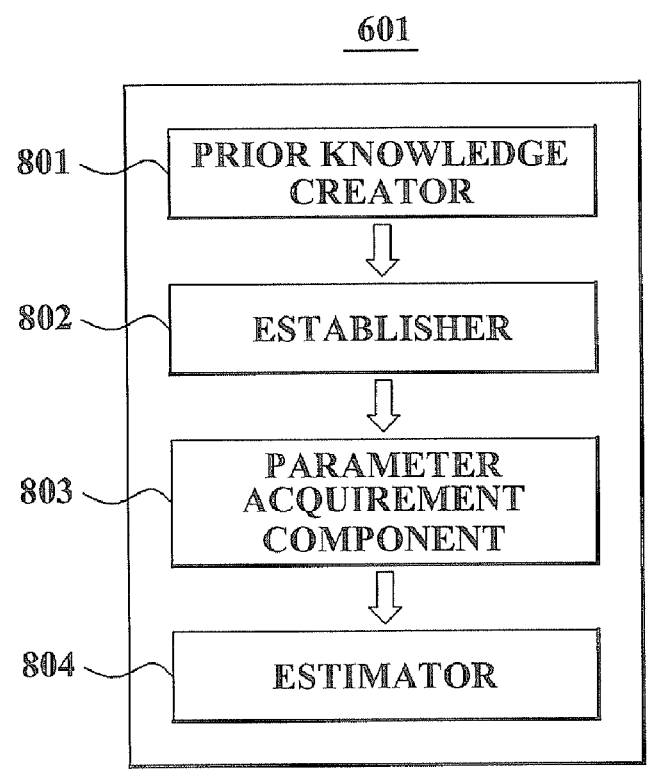
FIG. 8 is a block diagram illustrating an internal configuration of a probability value group estimator according to another exemplary embodiment of the present invention.

FIG. 8 is a block diagram illustrating an internal configuration of the probability value group estimator 601 according to another exemplary embodiment of the present invention. As shown in FIG. 8, the probability value group estimator 601 may include a prior knowledge creator 801, an establisher 802, a parameter acquirement component 803, and an estimator 804.

The prior knowledge creator 801 creates prior knowledge by using the data group. In this instance, the prior knowledge includes a group of the number of searches for the keyword.

Also, the prior knowledge creator 801 creates a search number group including a number of searches for each of all keywords, included in the data group, as an element, and creates a result group as the prior knowledge. In this instance, the result group is calculated by applying a predetermined operation scheme to the search number group.

Also, the operation scheme may include 1) a scheme of applying a ratio, the ratio being a total number of searches of the first group to a total number of all searches, to each element of the search number group and thereby calculating a first result value group, and 2) a scheme of applying a ratio, the ratio being a total number of searches of the second group to a total number of all searches, to each element of the search number group and thereby calculating a second result value group. Also, the result group may include the first result value group and the second result value group.

The establisher 802 establishes a prior distribution associated with a maximum-likelihood estimate and the prior knowledge by assuming the distribution of the probability value group as a Dirichlet distribution.

The parameter acquirement component 803 acquires a parameter by estimating a posterior distribution using a Bayesian estimate. In this instance, the parameter describes the Dirichlet distribution. Also, the Bayesian estimate assumes the parameter as a distribution, not one fixed point and then estimates the distribution. As shown in Equation 9 with reference to FIG. 3, the result of estimating the posterior distribution may be defined as the parameter describing the Dirichlet distribution using the prior knowledge and the number of searches.

The estimator 804 estimates the probability value group based on the estimated posterior distribution. The probability value group may include an element of the parameter as one probability value with respect to an addition of all elements of the parameter. As described above, the probability value group created using the estimator 804 may be utilized to create the keyword value using a keyword value calculator 902. The keyword value calculator 902 corresponds to the internal configuration of the creator 602 and will be described with reference to FIG. 9.

Figure 9:
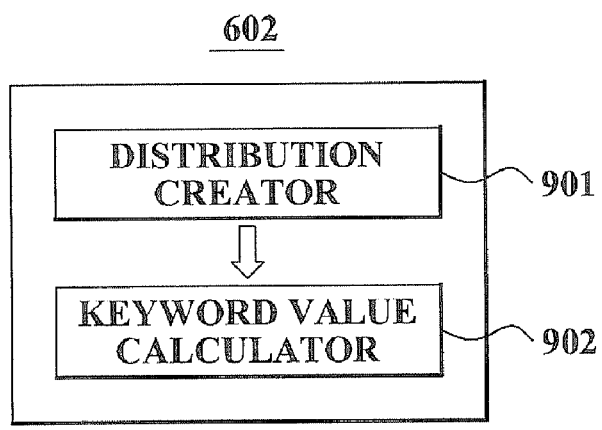
FIG. 9 is a block diagram illustrating an internal configuration of a creator according to an exemplary embodiment of the present invention.

FIG. 9 is a block diagram illustrating an internal configuration of the creator 602 according to an exemplary embodiment of the present invention. As shown in FIG. 9, the creator 602 may include a distribution creator 901 and the keyword value calculator 902.

The distribution creator 901 creates a multinomial distribution including the probability value group of each of the first group and the second group.

The keyword value calculator 902 calculates the keyword value, based on a KL distance and a KL expression associated with the multinomial distribution, as a calculator configured to calculate a difference between two distributions. In this instance, the KL expression may utilize an absolute numerical value of the probability value for each of the first group and the second group, and a relative numerical value of the probability value between the first group and the second group. Also, a result value of the KL expression may indicate a distribution difference for the keyword between the first group and the second group, and a relative importance of the keyword in each of the first group and the second group.

Figure 10:
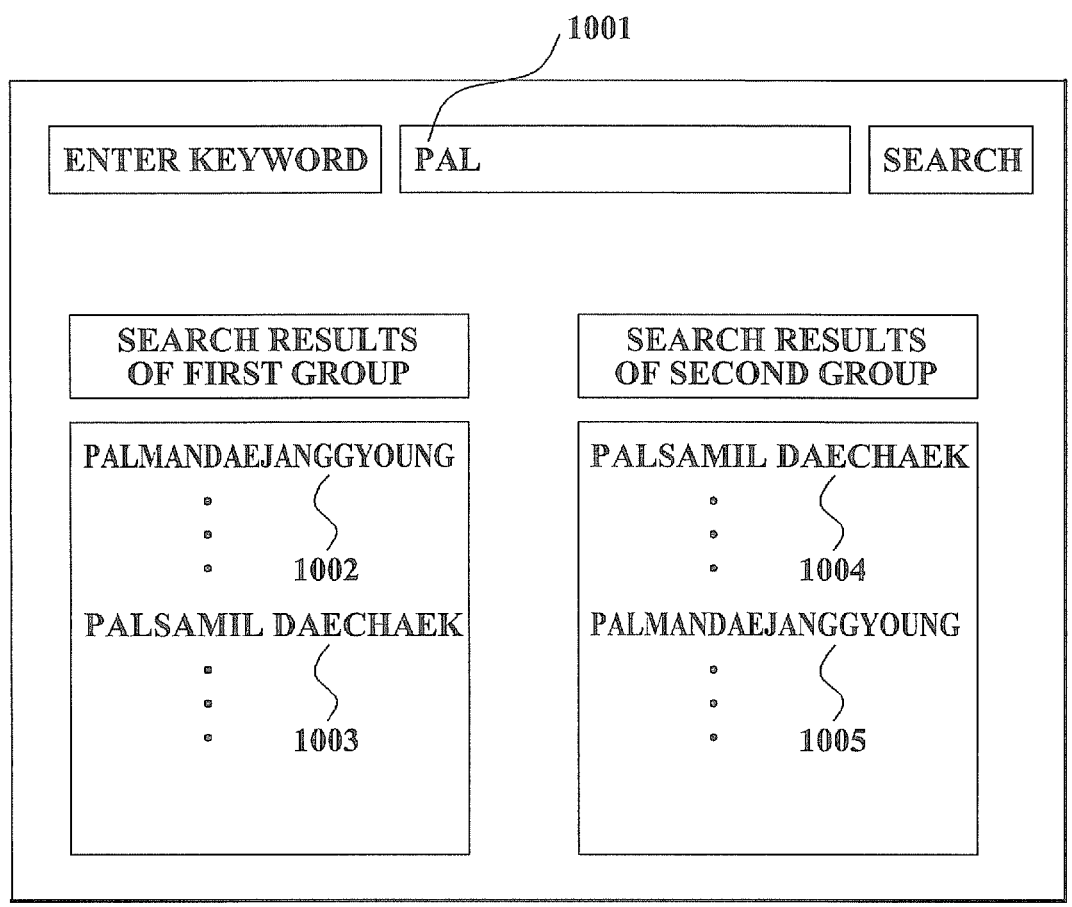
FIG. 10 illustrates an example of utilizing an output group according to an exemplary embodiment of the present invention.

FIG. 10 illustrates an example of utilizing an output group according to an exemplary embodiment of the present invention.

The output group described above with reference to FIGS. 1 through 4 or FIGS. 5 through 9 may be utilized to show a difference and a degree of interest between the first group and the second group. In FIG. 10, the first group corresponds to a group of teenagers and the second group corresponds to a group of people in their forties. The first group and the second group are utilized as the output groups. Accordingly, it is possible to see the difference and the matter of interest between teenagers and people in their forties by using the output groups.

Referring to FIG. 10, as search results for a keyword 'PAL' 1001, search results of the group of teenagers include 'PALMANDAEJANGGYOUNG (which is the Tripitaka Koreana, the Korean national treasure)' 1002 and 'PALSAMIL DAECHAEK (which is a real estate policy published on August 31)' 1003. Also, search results of the group of people in their forties include 'PALSAMIL DAECHAEK' 1004 and 'PALMANDAEJANGGYOUNG' 1005. Although the identical keyword is used, it is possible to see that a rank or display location may be different using the above-described keyword value, depending upon the difference and the degree of interest between the first group and the second group.

The keyword retrieval method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, it is possible to assign a keyword value for each keyword to a keyword showing a difference between two groups, and thereby create an output group in which a keyword group is sorted by the keyword value and to readily predict the difference or a degree of interest between two groups.

Also, according to the present invention, it is possible to differently sort the keyword in the output group for each of the groups using the keyword value.

Also, according to the present invention, it is possible to reflect a number of searches for the keyword in the keyword value and thereby place a keyword frequently retrieved by two groups in a comparatively higher place of the output group.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A method of sorting out a search keyword showing a difference between two groups of searchers, the method being implemented on a computer-readable recording medium comprising instructions, that when executed, implement the method, comprising:

creating a plurality of tuples associated with a plurality of keywords for a first group of searchers and a second group of searchers, wherein each tuple comprises a keyword, a number of searches of the keyword by the first group of searchers and a number of searches of the keyword by the second group of searchers;

defining a data group comprising a group of the created tuples;

creating a keyword value for each of the keywords by using the data group, wherein the keyword value is based on the number of searches of the keyword by the first group of searchers and the number of searches of the keyword by the second group of searchers;

creating a keyword group associated with the keywords and the keyword value corresponding to each of the keywords; and creating an output group describing at least one attribute of each group of searchers, wherein the output group comprises the keyword group, wherein the keyword group comprises a group comprising the keyword, the keyword value, and a number of searches for the keyword, and the output group sorts the keyword group by the keyword value.

2. The method of claim 1, wherein creating a plurality of tuples comprises:

creating a tuple with respect to a first keyword, wherein the tuple defines a group comprising the keyword, a number of searches of the first group for the first keyword, and a number of searches of the second group for the first keyword; and repeatedly creating a tuple with respect to each of the plurality of keywords and defining the data group comprising the tuple as an element.

3. The method of claim 1, wherein creating the keyword value comprises:

estimating a probability value group comprising a group of probability values with respect to a probability that a user retrieves a keyword based on the data group; and creating the keyword value for the keyword using the probability value group, wherein the keyword value indicates a distribution difference between a number of searches of the first group for the keyword and a number of searches of the second group for the keyword, and a relative importance of the keyword in each of the first group and the second group.

4. The method of claim 3, wherein estimating comprises:

defining the probability value by assuming a probability model having a discrete distribution, the user retrieving the keyword from each of the first group and the second group according to the probability model;

checking a distribution of the number of searches of the first group and a distribution of the number of searches of the second group using a multinomial distribution; and estimating the probability value group corresponding to a parameter of the discrete distribution using a maximum-likelihood estimate of the multinomial distribution.

5. The method of claim 3, wherein estimating comprises:

creating prior knowledge by using the data group, the prior knowledge comprising a group of the number of searches for the keyword;

establishing a prior distribution associated with a maximum-likelihood estimate and the prior knowledge by assuming the distribution of the probability value group being a Dirichlet distribution;

acquiring a parameter by estimating a posterior distribution using a Bayesian estimate, the parameter describing the Dirichlet distribution; and estimating the probability value group based on the estimated posterior distribution.

6. The method of claim 5, wherein creating the prior knowledge comprises:

creating a search number group comprising a number of searches for each keyword provided by the data group, as an element; and creating a result group as the prior knowledge, the result group being calculated by applying a determined operation scheme to the search number group.

7. The method of claim 6, wherein the operation scheme comprises 1) a scheme of applying a ratio, the ratio being a total number of searches of the first group to a total number of all searches, to each element of the search number group and calculating a first result value group, and 2) a scheme of applying a ratio, the ratio being a total number of searches of the second group to the total number of all searches, to each element of the search number group and calculating a second result value group, wherein the result group comprises the first result value group and the second result value group.

8. The method of claim 3, wherein creating the keyword value comprises:

creating a multinomial distribution comprising the probability value group of each of the first group and the second group; and calculating the keyword value, based on a Kullback-Leibler (KL) distance and a KL expression associated with the multinomial distribution, as a calculator configured to calculate a difference between two distributions.

9. The method of claim 8, wherein the KL expression utilizes an absolute numerical value of a probability value for each of the first group and the second group, and a relative numerical value of a probability value between the first group and the second group, and wherein a result value of the KL expression indicates a distribution difference for the keyword between the first group and the second group, and a relative importance of the keyword in each of the first group and the second group.

10. A system for sorting out a search keyword showing a difference between two groups of searchers, the system implemented on a computer-readable recording medium comprising instructions, that when executed, implement the system, comprising:

a data group definition component configured to create a plurality of tuples associated with a plurality of keywords with respect to a first group of searchers and a second group of searchers, and to define a data group comprising a group of the tuples, wherein each tuple comprises a keyword, a number of searches of the keyword by the first group of searchers and a number of searches of the keyword by the second group of searchers;

a keyword value creator configured to create a keyword value for each of the keywords by using the data group, wherein the keyword value is based on the number of searches of the keyword by the first group of searchers and the number of searches of the keyword by the second group of searchers; and an output group creator configured to create a keyword group that defines the keywords and keyword values corresponding to each of the keywords, and to create an output group that describes at least one attribute of each group of searchers, wherein the output group comprises the keyword group, wherein the keyword group comprises a group comprising the keyword, the keyword value, and a number of searches for the keyword, and the output group sorts the keyword group by the keyword value.

11. The system of claim 10, wherein the data group definition component comprises:

a tuple creation component configured to create a tuple associated with a keyword, the tuple comprising a group comprising the keyword, a number of searches of the first group of searchers for the keyword, and a number of searches of the second group of searchers for the keyword; and a repeat execution component configured to repeatedly execute the tuple creation component with respect to each of the keywords and to define the data group comprising the tuple as an element.

12. The system of claim 10, wherein the keyword value creator comprises:

a probability value group estimator configured to estimate a probability value group comprising a group of probability values with respect to a probability that a user retrieves a keyword based on the data group; and a creator configured to create the keyword value for the keyword using the probability value group, wherein the keyword value indicates a distribution difference between a number of searches of the first group and a number of searches of the second group for a first keyword, and a relative importance of the first keyword in each of the first group and the second group.

13. The system of claim 12, wherein the probability value group estimator comprises:

a probability value definition component configured to define the probability value by assuming a probability model in which the user retrieves the keyword from each of the first group and the second group, the probability model having a discrete distribution;

a distribution checker configured to check, using a multinomial distribution, a distribution of the number of searches of the first group and the number of searches of the second group; and an estimator configured to estimate a probability value group corresponding to a parameter of the discrete distribution using a maximum-likelihood estimate of the multinomial distribution.

14. The system of claim 12, wherein the probability value group estimator comprises:

a prior knowledge creator configured to create prior knowledge by using the data group, the prior knowledge comprising a group of a number of searches for the keyword;

an establisher configured to establish a prior distribution associated with a maximum-likelihood estimate and the prior knowledge by assuming a distribution of the probability value group being a Dirichlet distribution;

a parameter acquirement component configured to acquire a parameter by estimating a posterior distribution using a Bayesian estimate, the parameter describing the Dirichlet distribution; and an estimator configured to estimate the probability value group based on the estimated posterior distribution.

15. The system of claim 14, wherein the prior knowledge creator creates a search number group comprising a number of searches for the plurality of keywords provided by the data group, as an element, and creates a result group as the prior knowledge, the result group being calculated by applying an operation scheme to the search number group, the operation scheme comprising 1) a scheme of applying a ratio, the ratio being a total number of searches of the first group to a total number of all searches, to each element of the search number group and calculating a first result value group, and 2) a scheme of applying a ratio, the ratio being a total number of searches of the second group to a total number of all searches, to each element of the search number group and calculating a second result value group, and the result group comprising the first result value group and the second result value group.

16. The system of claim 12, wherein the creator comprises:

a distribution creator configured to create a multinomial distribution comprising a probability value group of the first group and a probability value group of the second group; and a keyword value calculator configured to calculate the keyword value, based on a KL distance and a KL expression associated with the multinomial distribution, as a calculator configured to calculate a difference between two distributions.

17. The system of claim 16, wherein the KL expression utilizes an absolute numerical value of a probability value for each of the first group and the second group, and a relative numerical value of a probability value between the first group and the second group, and wherein a result value of the KL expression indicates a distribution difference for the keyword between the first group and the second group, and a relative importance of the keyword in each of the first group and the second group.

* * * * *